United States Patent
Le Dard et al.

(10) Patent No.: US 8,411,261 B2
(45) Date of Patent: Apr. 2, 2013

(54) SYSTEM FOR DETERMINING THE LENGTH OF AN OPTICAL FIBER UNWOUND FROM/REMAINING ON A STORAGE REEL PARTICULARLY HOUSED IN AN UNDERWATER WEAPON

(75) Inventors: Michel Le Dard, Sainte Maxime (FR); Noel Vandenbussche, Cogolin (FR)

(73) Assignee: DCNS, Paris (FR)

( * ) Notice: Subject to any disclaimer, the term of this patent is extended or adjusted under 35 U.S.C. 154(b) by 0 days.

(21) Appl. No.: 13/376,054

(22) PCT Filed: Jun. 4, 2010

(86) PCT No.: PCT/FR2010/051096
§ 371 (c)(1),
(2), (4) Date: Jan. 27, 2012

(87) PCT Pub. No.: WO2010/139907
PCT Pub. Date: Dec. 9, 2010

(65) Prior Publication Data
US 2012/0120416 A1    May 17, 2012

(30) Foreign Application Priority Data
Jun. 4, 2009    (FR) ..................................... 09 53690

(51) Int. Cl.
*G01N 21/00* (2006.01)
(52) U.S. Cl. .................................................... 356/73.1
(58) Field of Classification Search .................. 356/73.1
See application file for complete search history.

(56) References Cited

U.S. PATENT DOCUMENTS

| 5,564,649 | A | 10/1996 | Von Hoessle | 244/3.12 |
| 6,519,026 | B1 * | 2/2003 | Holland | 356/73.1 |
| 7,190,868 | B2 * | 3/2007 | Yamamoto et al. | 385/123 |
| 7,869,014 | B2 * | 1/2011 | Tadakuma et al. | 356/73.1 |
| 2004/0075585 | A1 | 4/2004 | Kaiser et al. | 340/946 |
| 2009/0097014 | A1 | 4/2009 | Piciaccia et al. | 356/73.1 |

FOREIGN PATENT DOCUMENTS

| DE | 44 14 737 | 1/1996 |
| EP | 0 693 670 | 1/1996 |

* cited by examiner

*Primary Examiner* — Tu Nguyen
(74) *Attorney, Agent, or Firm* — Davidson, Davidson & Kappel, LLC

(57) ABSTRACT

A system is provided that determines the length of an optical fiber unwound from or remaining on at least one storage reel. The fiber is used as a medium for transmitting information between a weapon and an underwater vehicle, from which the weapon was fired. The determination system measures the backscattered light power in the fiber, analyzes this power signal in order to detect a backscattered light power discontinuity that corresponds to the location of the fiber where the fiber leaves the reel, localizes this location along the fiber, and determines from this localization and from the length of fiber initially wound on the reel, the length of fiber unwound from or remaining on the reel.

8 Claims, 1 Drawing Sheet

SYSTEM FOR DETERMINING THE LENGTH OF AN OPTICAL FIBER UNWOUND FROM/REMAINING ON A STORAGE REEL PARTICULARLY HOUSED IN AN UNDERWATER WEAPON

The present invention relates to a system for determining the length of an optical fiber unwound from/remaining on a storage reel notably housed in an underwater weapon.

BACKGROUND

In general, documents US 2004/0075585, EP 0 693 670, DE 44 14 737, and US 2009/0097014 describe for some of them systems for determining the length of optical fibers and for the other ones systems for weapon tracking.

An underwater weapon is for example formed by a torpedo or by any other type of underwater missile or with change of medium fired or launched from an underwater vehicle, such as a submarine strictly speaking.

The free end of the fiber is connected to the submarine and during displacements of the torpedo the fiber is then unwound from the reel of the weapon and is used as a medium for transmitting information between the vehicle and the weapon in order to for example ensure fiber guidance during at least one portion of its displacement for example towards a target.

Generally, it is known to use the length of a wire unwound behind a torpedo in order to know the distance covered by the latter since its launching, and in particular, this has been applied to wire-guided torpedoes which unwind a copper wire behind them.

The coating of this copper wire then has magnetic means at regular intervals which, during the unwinding of the wire, give the possibility of counting beeps upon the passing of these means in front of the corresponding sensors of the torpedo, and therefore of reconstructing the distance covered by the weapon.

SUMMARY OF THE INVENTION

However, these structures have a certain number of drawbacks, notably regarding accuracy and cost.

Indeed, the application on the copper wire or on any other type of cable including optical cables of magnetic means at regular intervals, has a relatively significant cost and which cost is all the more elevated when the required accuracy is high.

Indeed, the higher the required accuracy, the more corresponding magnetic means should be placed on the wire.

It is conceivable that this is relatively costly.

An object of the present invention may provide accuracy and may reduce costs.

An object of the present invention includes a system for determining the length of an optical fiber unwound from or remaining on at least one storage reel, the fiber being used as a medium for transmitting information between a weapon and an underwater vehicle, from which the weapon was fired. The system includes means for measuring the backscattered light power in the fiber, means for analyzing this power signal, in order to detect a backscattered light power discontinuity corresponding to the location of the fiber when the latter leaves the reel, means for localizing this location along the fiber, and means for determining from the localization and from the fiber length initially wound on the reel, the length of fiber unwound from or remaining on the reel.

According to other aspects of the present invention, the determination system may include one or more of the following features:

the means for measuring, for analyzing, for localizing and for determining are associated with a storage reel integrated into the weapon and/or the underwater vehicle, it further includes means for calculating the displacement velocity of the weapon, it is further associated with a trajectory calculator, the underwater weapon is a torpedo, the underwater vehicle is a submarine, strictly speaking.

BRIEF DESCRIPTION OF THE DRAWINGS

The invention will be better understood from the description which follows, only given as an example and made with reference to the appended drawings, wherein.

DETAILED DESCRIPTION

Figure 1:
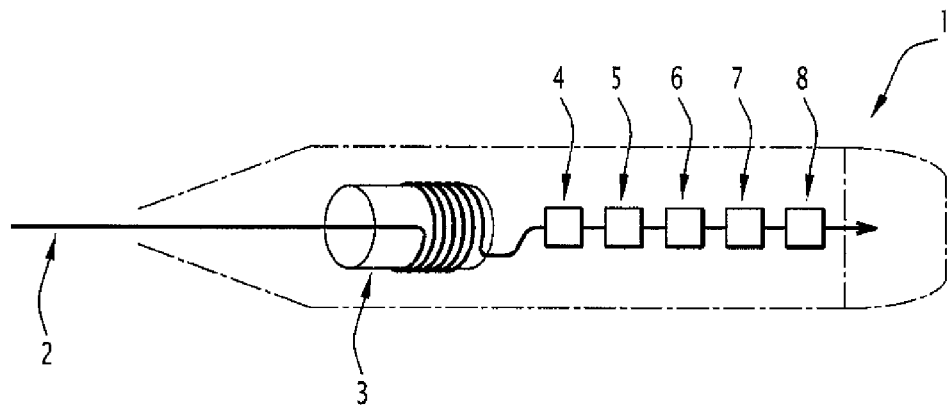
FIG. 1 illustrates a block diagram of an underwater weapon integrating a determination system according to the invention.

An underwater weapon has actually been illustrated in FIG. 1, schematically, such as a torpedo designated by the general reference 1.

Of course, any other form of underwater missile or with change of medium may be contemplated.

This torpedo is for example, launched or fired from an underwater vehicle, such as a submarine and unwinds in its wake a fiber such as, for example the fiber designated by the general reference 2, from a storage reel designated by the general reference 3 housed in the underwater weapon.

The free end of the fiber 2 is connected to the underwater vehicle.

As this was indicated earlier, this fiber 2 is intended to be used as a medium for transmitting information between the vehicle and the weapon 1 and is in particular, intended for allowing wire guidance of the weapon 1 from the underwater vehicle in a conventional way.

In fact, the system according to the invention includes means for measuring the backscattered light power in the fiber 2, these means being designated by the general reference 4 in this figure and positioned in the weapon 1 so as to be connected to the corresponding end of the fiber 2.

The output of these measurements means 4 is connected to means for analyzing this power signal in order to detect a backscattered light power discontinuity corresponding to the location of the fiber 2 where the latter leaves the storage reel 3 in the weapon 1.

Figure 2:
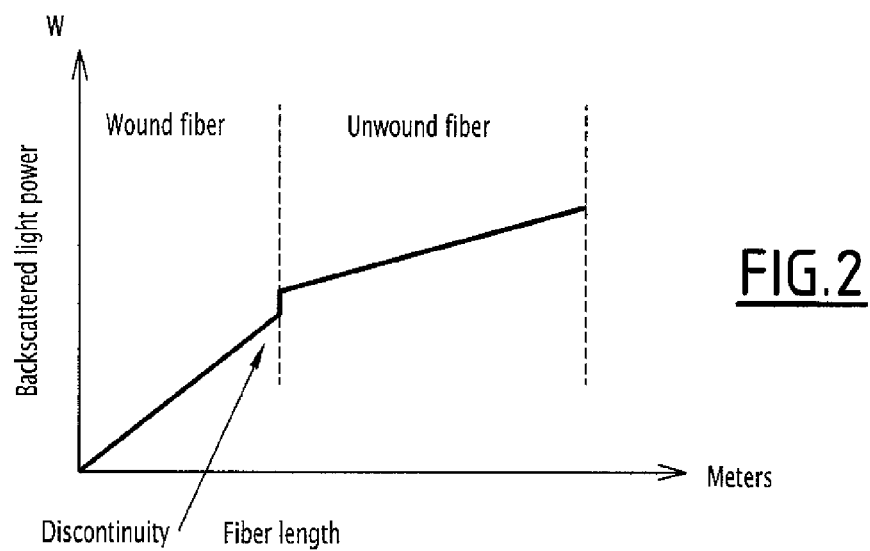
FIG. 2 illustrates the operation of the latter.

These means are designated by the general reference 5 and the discontinuity is illustrated in FIG. 2. The latter corresponds to the location where the fiber 2 leaves the reel 3 and results from intrinsic properties of the fiber as known per se.

This then allows means 6 for localizing this location along the fiber, to deliver this information to means for determining both from this localization and from the fiber length initially wound on the reel 3, the length of fiber unwound from/remaining on the reel 3.

These determination means are designated by the general reference 7 in this figure and then allow calculation of a piece of information on the covered distance, in real-time, for example by the torpedo 1 since its firing or its launching from the underwater vehicle.

Means 8 for calculating the velocity of this torpedo 1 from the variation of the discontinuity's position may also be contemplated.

It is conceivable that such a structure has a certain number of advantages, notably regarding the increase in the performances of the determination system as compared with the magnetic means of the state of the art, notably in terms of accuracy and cost.

In particular such a structure gives the possibility of increasing the accuracy in the calculation of the real-time position of the weapon.

The information on the covered distance and on the velocity may be transmitted to a trajectory calculator associated with the system.

Furthermore, the information is delivered continuously and not bit by bit from several hundred meters away, as this was the case with the magnetic means.

The cost of serial mass production is zero for the fiber since no intervention is required and no additional means is required on the latter, the system applying an intrinsic property of the fiber which is therefore the detection of a discontinuity in the backscattered light power at the location where the fiber 2 leaves the reel 3 in order to be released in the wake of the torpedo 1.

In fact, this property has already been used in the state of the art for detecting fiber defects.

In the system according to the invention, the bend formed by the fiber 2 at the location where it leaves the reel 3, actually causes this discontinuity because of the winding of the fiber 2 on a reel 3 with an axis parallel or coinciding with the longitudinal axis of the weapon 1.

Of course, other embodiments may further be contemplated.

Figure 3:
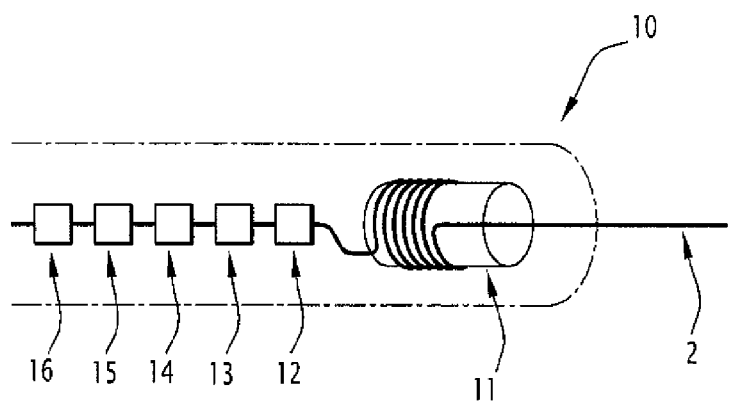
FIG. 3 illustrates a block diagram of a submarine integrating a determination system according to the invention.

Thus, for example and as this is illustrated in FIG. 3, analog means may be associated with a reel 11 integrated into the underwater vehicle 10 and in particular in a submarine strictly speaking.

Such a structure may be provided in the place of or as an addition to the structure integrated into the weapon.

In this FIG. 3, a submarine is indeed illustrated that is designated by the general reference 10, and from which the optical fiber 2 extends.

This fiber is unwound from a reel 11 integrated into the submarine and which is associated with means for measuring the backscattered power in the fiber designated by reference 12, with means 13 for analyzing this signal, with means 14 for localizing the discontinuity, with means 15 for localizing the location where the fiber leaves the reel and optionally with means 16 for calculating the velocity of the weapon.

The covered distance and velocity information may be transmitted to a trajectory calculator associated with the system and then integrated into the submarine.

Of course other embodiments may further be contemplated.

What is claimed is:

1. A system for determining a length of an optical fiber unwound from or remaining in at least one storage reel, the fiber being used as a medium for transmitting information between a weapon and an underwater vehicle from which the weapon has been fired, the system comprising:
    a backscattered light power meter for measuring the backscattered light power in the fiber;
    a backscattered light power signal analyzer for analyzing the backscattered light power signal and for detecting a backscattered light power discontinuity corresponding to a location of the fiber where the fiber leaves the reel;
    a localization analyzer for localizing the location along the fiber; and
    a calculator for determining from the localization and from a length of fiber initially wound on the reel, the length of fiber unwound from or remaining on the reel.

2. The system for determining the length of an optical fiber according to claim 1 wherein the backscattered light power meter, the backscattered light power signal analyzer, the localization analyzer and the calculator for measuring, for analyzing, for localizing and for determining are associated with the storage reel and integrated into the weapon or the underwater vehicle.

3. The system for determining the length of an optical fiber according to claim 1 further comprising a displacement velocity calculator for calculating the displacement velocity of the weapon.

4. The system for determining the length of an optical fiber according to claim 1 further comprising a trajectory calculator.

5. The system for determining the length of an optical fiber according to claim 1 wherein the underwater weapon is a torpedo.

6. The system for determining the length of an optical fiber according to claim 1 wherein the underwater vehicle is a submarine.

7. A method for determining a length of an optical fiber unwound from or remaining in at least one storage reel, the fiber being used as a medium for transmitting information between a weapon and an underwater vehicle from which the weapon has been fired, the method comprising the steps of:
    measuring the backscattered light power in the fiber;
    analyzing the backscattered light power signal;
    detecting a backscattered light power discontinuity corresponding to a location of the fiber where the fiber leaves the reel;
    localizing the location along the fiber; and
    determining from the localization and from a length of fiber initially wound on the reel, the length of fiber unwound from or remaining on the reel.

8. The method as recited in claim 7 further comprising the step of:
    calculating the displacement velocity of the weapon.

* * * * *